US008737506B1

(12) United States Patent
Shetty et al.

(10) Patent No.: US 8,737,506 B1
(45) Date of Patent: May 27, 2014

(54) DETERMINATION OF TRANSMIT DIVERSITY TRANSMISSION DELAYS

(75) Inventors: Manoj Shetty, Overland Park, KS (US); Sachin R. Vargantwar, Overland Park, KS (US); Anoop Kumar Goyal, Overland Park, KS (US); Siddharth S. Oroskar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 352 days.

(21) Appl. No.: 12/981,157

(22) Filed: Dec. 29, 2010

(51) Int. Cl.
*H04B 7/02* (2006.01)

(52) U.S. Cl.
USPC ........... 375/267; 375/260; 375/259; 375/295; 375/299

(58) Field of Classification Search
USPC .......................... 375/267, 260, 259, 295, 299
See application file for complete search history.

(56) References Cited

U.S. PATENT DOCUMENTS

| | | | |
|---|---|---|---|
| 5,305,353 A | | 4/1994 | Weerackody |
| 5,614,514 A | | 3/1997 | Axelsson et al. |
| 6,347,234 B1 * | | 2/2002 | Scherzer .................... 455/562.1 |
| 6,366,568 B1 | | 4/2002 | Bolgiano et al. |
| 6,370,397 B1 * | | 4/2002 | Popovic et al. ............... 455/561 |
| 6,400,780 B1 | | 6/2002 | Rashid-Farrokhi et al. |
| 7,062,232 B2 | | 6/2006 | Coan et al. |
| 7,174,178 B2 * | | 2/2007 | Bergel .......................... 455/502 |
| 7,248,841 B2 * | | 7/2007 | Agee et al. .................... 455/101 |
| 7,302,238 B2 | | 11/2007 | Fujii |
| 7,522,673 B2 * | | 4/2009 | Giannakis et al. ............. 375/267 |
| 7,567,624 B1 * | | 7/2009 | Schmidl et al. ............... 375/299 |
| 7,680,202 B2 | | 3/2010 | Chan et al. |
| 7,826,515 B2 | | 11/2010 | Reial |
| 8,400,950 B2 * | | 3/2013 | Ko et al. ........................ 370/278 |
| 2002/0193146 A1 | | 12/2002 | Wallace et al. |
| 2003/0081574 A1 * | | 5/2003 | Moon et al. ................... 370/334 |
| 2004/0014431 A1 * | | 1/2004 | Lo .................................. 455/73 |
| 2004/0190599 A1 * | | 9/2004 | Lim ............................. 375/144 |
| 2005/0037718 A1 * | | 2/2005 | Kim et al. .................... 455/101 |
| 2005/0197079 A1 | | 9/2005 | Banister et al. |
| 2005/0254592 A1 * | | 11/2005 | Naguib et al. ................ 375/267 |
| 2006/0017626 A1 | | 1/2006 | Kannan et al. |
| 2006/0067421 A1 * | | 3/2006 | Walton et al. ................. 375/267 |
| 2006/0193245 A1 * | | 8/2006 | Aghvami et al. ............. 370/208 |
| 2006/0223565 A1 | | 10/2006 | Gandhi et al. |
| 2006/0233275 A1 | | 10/2006 | Chen et al. |
| 2007/0041457 A1 * | | 2/2007 | Kadous et al. ................ 375/260 |
| 2007/0248038 A1 * | | 10/2007 | Yamasaki et al. ............. 370/328 |
| 2008/0080633 A1 * | | 4/2008 | Botha et al. .................. 375/267 |
| 2008/0095141 A1 * | | 4/2008 | Kong et al. ................... 370/345 |
| 2008/0123768 A1 | | 5/2008 | Harel et al. |
| 2009/0034585 A1 * | | 2/2009 | Hua et al. ..................... 375/130 |
| 2009/0046008 A1 * | | 2/2009 | Murakami et al. ........... 342/373 |

(Continued)

OTHER PUBLICATIONS

U.S. Appl. No. 13/028,830, filed Feb. 16, 2011.

(Continued)

*Primary Examiner* — Kenneth Lam

(57) ABSTRACT

What is disclosed is a method of operating a wireless access system. The method includes exchanging wireless communications with a plurality of user devices using a first transmit diversity configuration, receiving multipath information from the user devices for the wireless communications, and processing the multipath information to determine a second transmit diversity configuration. The method also includes transferring an indicator of the second transmit diversity configuration to the user devices, and exchanging further wireless communications with the user devices using the second transmit diversity configuration.

18 Claims, 6 Drawing Sheets

(56) References Cited

U.S. PATENT DOCUMENTS

| | | | |
|---|---|---|---|
| 2009/0122884 A1* | 5/2009 | Vook et al. | 375/260 |
| 2009/0191832 A1 | 7/2009 | Catreux-Erceg et al. | |
| 2009/0279486 A1* | 11/2009 | Kishigami et al. | 370/329 |
| 2010/0103810 A1* | 4/2010 | Kloos et al. | 370/204 |
| 2010/0246516 A1* | 9/2010 | Pelletier et al. | 370/329 |
| 2011/0216754 A1* | 9/2011 | Hey-Shipton et al. | 370/342 |

OTHER PUBLICATIONS

U.S. Appl. No. 13/173,179, filed Jun. 30, 2011.

George Lee, et al.; "Automatic Service Selection in Dynamic Wireless Network Environments," pp. 1-2; Computer Science and Artificial Intelligence Laboratory; Massachusetts Institute of Technology; Cambridge, MA, Sep. 2003.

\* cited by examiner

DETERMINATION OF TRANSMIT DIVERSITY TRANSMISSION DELAYS

TECHNICAL FIELD

Aspects of the disclosure are related to the field of wireless communications, and in particular, determination of transmission delays for transmit diversity antenna systems in wireless communication networks.

TECHNICAL BACKGROUND

Wireless communication systems typically include wireless access nodes through which user devices can receive wireless access to communication services. The communication services can include voice calls, text messaging, data access, and web content, among other services. Many wireless access nodes are typically distributed across a geographic region to provide the wireless access to mobile user devices moving throughout the geographic region.

The wireless links over which user devices and wireless access nodes communicate can experience various forms of interference, fading, signal loss, or other radio frequency (RF) quality issues. Among these RF quality issues is multipath interference. Multipath interference can occur when communications transmitted by a wireless source take multiple paths to reach a wireless receiver, such as due to reflections from buildings, terrain, or other structures. The wireless receiver experiencing multipath interference may receive multiple instances of a single transmission, which can lead to poor signal quality, misinterpreted communications, or slow transmission rates.

OVERVIEW

What is disclosed is a method of operating a wireless access system. The method includes exchanging wireless communications with a plurality of user devices using a first transmit diversity configuration, receiving multipath information from the user devices for the wireless communications, and processing the multipath information to determine a second transmit diversity configuration. The method also includes transferring an indicator of the second transmit diversity configuration to the user devices, and exchanging further wireless communications with the user devices using the second transmit diversity configuration.

What is also disclosed is a wireless access system. The wireless access system includes a transceiver configured to exchange wireless communications with a plurality of user devices using a first transmit diversity configuration, and receive multipath information from the user devices for the wireless communications. The wireless access system also includes a processing system configured to process the multipath information to determine a second transmit diversity configuration. The transceiver is also configured to transfer an indicator of the second transmit diversity configuration to the user devices, and exchange further wireless communications with the user devices using the second transmit diversity configuration.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
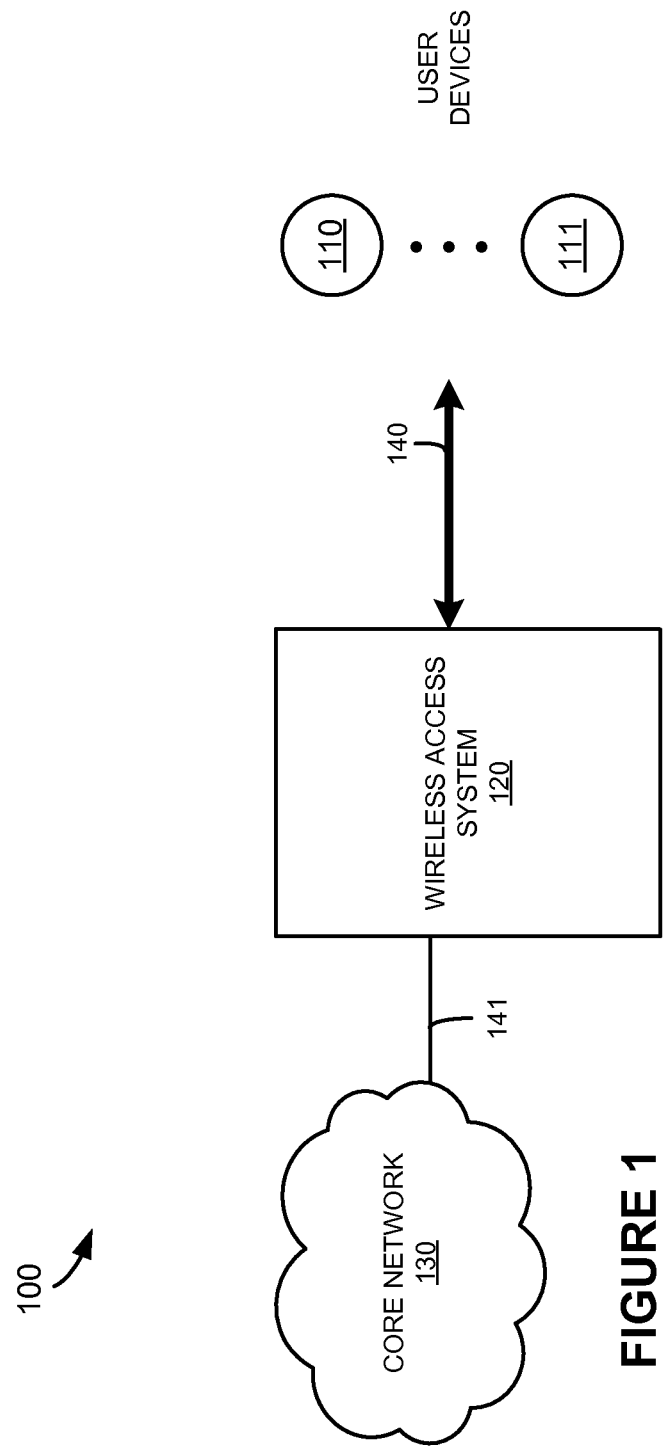
FIG. 1 is a system diagram illustrating a communication system.

FIG. 1 is a system diagram illustrating communication system 100. Communication system 100 includes user devices 110-111, wireless access system 120, and core network 130. Core network 130 and wireless access system communicate over link 141. Wireless access system 120 and each of user devices 110-111 communicate over wireless link 140. In this example, wireless link 140 is shown as a single wireless link shared by user devices 110-111, although in further examples individual wireless links could be shown. Wireless access system 120 provides wireless access over wireless link 140 to communication services for each of user devices 110-111. The communication services could include voice calls, text messages, data access, or other communication services, such as communication services provided by core network 130.

Figure 2:
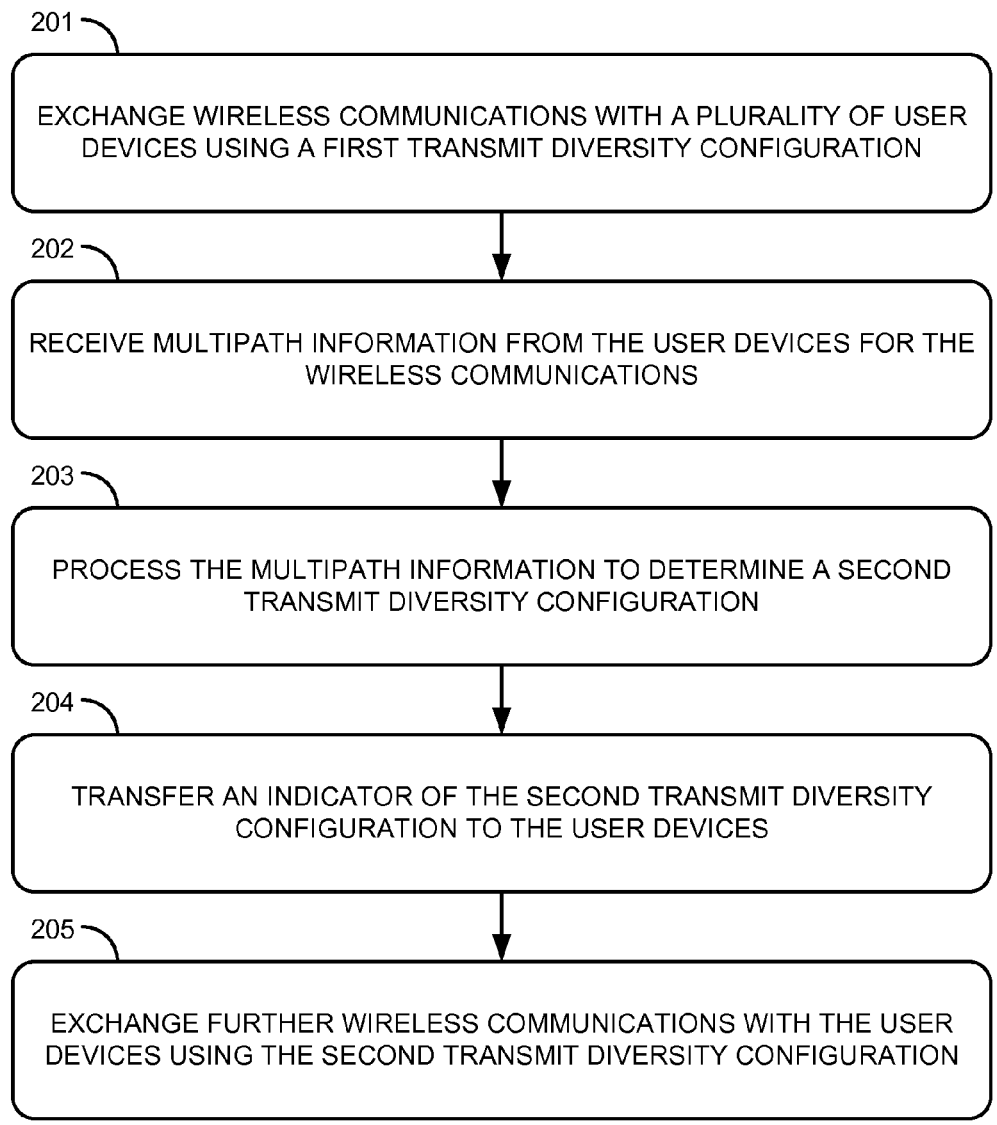
FIG. 2 is a flow diagram illustrating a method of operation of a wireless access system.

FIG. 2 is a flow diagram illustrating a method of operation of wireless access system 120. In this example, the operations of FIG. 2 are referenced herein parenthetically. In FIG. 2, wireless access system 120 exchanges (201) wireless communications with user devices 110-111 using a first transmit diversity configuration. The first transmit diversity configuration includes a time-based transmit diversity configuration in this example. Other examples of transmit diversity could also be employed, such as phase diversity, frequency diversity, spacial diversity, among others. In time-based transmit diversity, communications are transmitted in multiple time-delayed instances. For example, communications transferred by wireless access system 120 using the first transmit diversity configuration could include transmitting a first portion of the communications at a first instance in time, and transmitting the same first portion of the communications at a second instance in time, where the first instance in time and the second instance in time are separated by a time delay described by the first transmit diversity configuration. More than two transmit instances could be employed. Likewise, communications transferred by user devices 110-111 could also employ the first transmit diversity configuration similar to wireless access system 120.

In examples where the communications are transferred by wireless access system 120, then user devices 110-111 could each receive the communications as modified in transit by different propagation properties, such as multipath interference or other RF interference. Multipath interference can occur when the communications transmitted by wireless access system 120 experiences multiple propagation paths to reach each of user devices 110-111, such as due to reflections from buildings, terrain, or other structures. User devices 110-

111 which experience multipath interference may receive multiple instances of a single transmission, and when time-based diversity is employed, additional instances of the diversity-transferred communications could be received. User devices 110-111 would then each process the communications received from wireless access system 120 to determine multipath information for the communications. Each of user devices 110-111 could determine different multipath information.

Wireless access system 120 receives (202) multipath information from user devices 110-111 for the wireless communications. User devices 110-111 transfer the multipath information over wireless link 140 in this example. The multipath information could be included in user data, system messages, or could be responsive to messages transferred by wireless access system 120 requesting multipath information. The multipath information could include information on the communications received at each of user devices 110-111, such as indicators of the time separations of multiple instances of received communications, RF signal quality indicators, RF noise indicators, raw sampled RF data for the received communications, among other representations of multipath information.

Wireless access system 120 processes (203) the multipath information to determine a second transmit diversity configuration. The wireless communications transferred using the first transmit diversity configuration could be specialized communications transferred by wireless access system 120 to aid in determination of the multipath information, or could include normal communications—such as user communications or overhead communications—related to the operation of user devices 110-111. The multipath information received from each of user devices 110-111 is processed by wireless access system 120 to determine a different transmit diversity configuration. This second transmit diversity configuration could be determined to optimize various parameters of RF signal quality or RF power requirements for further communications. For example, the second transmit diversity configuration could be determined to reduce an RF power level of communications transferred by wireless access system 120 while still maintaining a threshold level of RF signal quality experienced at user devices 110-111. User devices 110-111 could also be differentiated for different levels of service or RF quality, such as providing better wireless service to user device 110 to the detriment of providing poorer wireless service for user device 111. Other configurations could be employed for the second transmit diversity configuration.

Wireless access system 120 transfers (204) an indicator of the second transmit diversity configuration to user devices 110-111. User devices 110-111 receive the second transmit diversity configuration over wireless link 140 in this example. The indicator of the second transmit diversity configuration could be a modifier for a default transmit diversity configuration, an indicator of a transmit delay between instances of communications, a transmit chip delay, or other indicator.

Wireless access system 120 exchanges (205) further wireless communications with user devices 110-111 using the second transmit diversity configuration. User devices 110-111 could use the indicator of the second transmit diversity configuration to modify a transmit diversity of a transceiver portion therein for the further communications, or use in receiving or interpreting communications transferred by wireless access system 120, among other configurations. Wireless access system 120 could use the second transmit diversity configuration on communications transferred therefrom, or for communications received from user devices 110-111, including combinations thereof.

Figure 3:
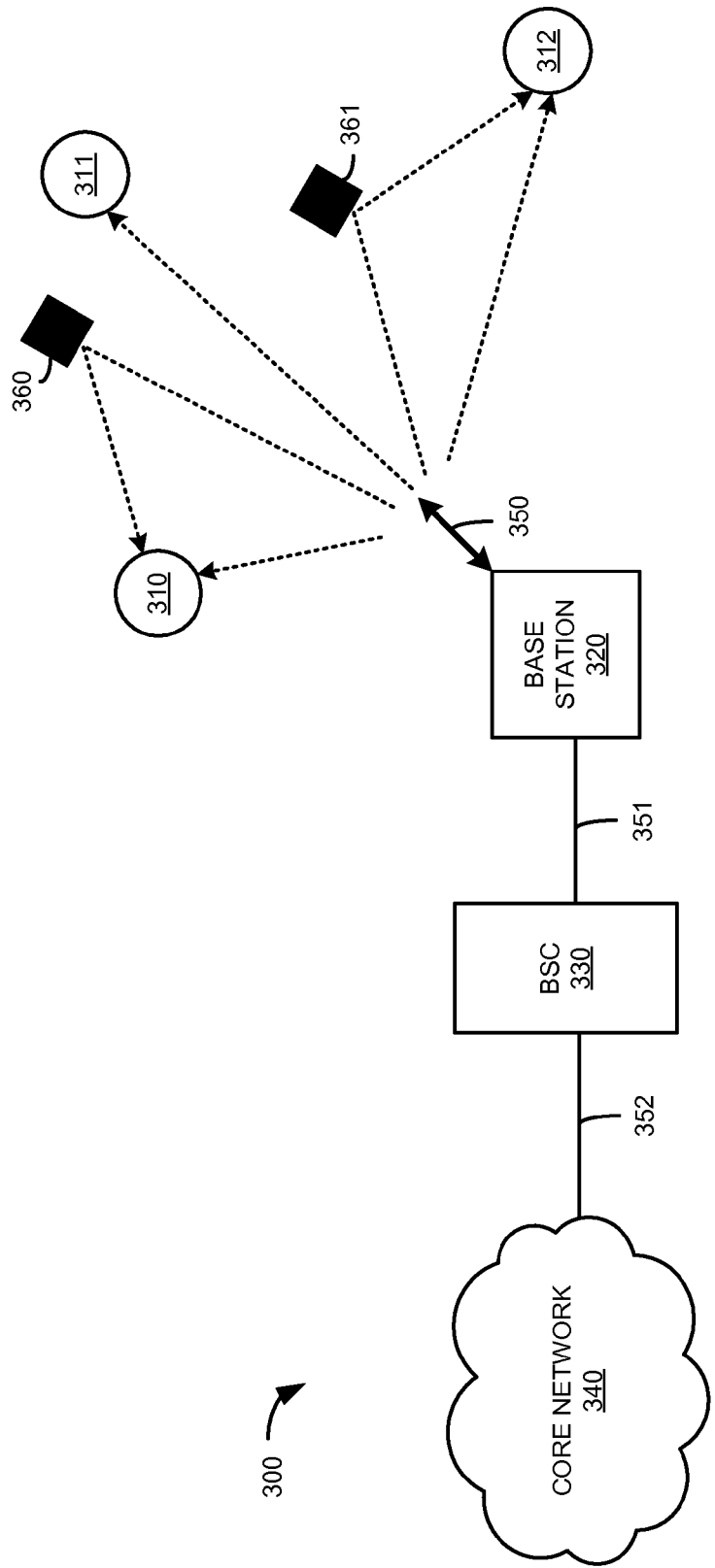
FIG. 3 is a system diagram illustrating a communication system.

FIG. 3 is a system diagram illustrating communication system 300. Communication system 300 includes user devices 310-312, base station 320, base station controller (BSC) 330, and core network 340. Core network 340 and BSC 330 communicate over link 352, which is a metropolitan-area optical networking link in this example. BSC 330 and base station 320 communicate over backhaul link 351, which is a T1 link capable of carrying Internet protocol (IP) packets in this example. Base station 320 and user devices 310-312 communicate over wireless link 350, which in this example is a wireless link using the Code Division Multiple Access (CDMA) wireless communication mode and protocol. Wireless link 350 is shown as taking multiple paths in FIG. 3, where the multiple paths are illustrated by the dotted lines between base station 320 and user devices 310-312, although other representations could be used. FIG. 3 also includes two obstacles, 360-361, which are buildings in this example. Obstacles 360-361 could instead comprise trees, rocks, terrain, vehicles, towers, sculptures, or other obstacles.

Base station 320 provides wireless access over wireless link 350 to communication services for each of user devices 310-312. The communication services could include voice calls, text messages, data access, or other communication services, such as communication services provided by core network 340. Base station 320 includes RF communication and control circuitry, transceivers, and antennas, as well as wireless communications equipment capable of communicating with and providing communication service to user devices using the CDMA communication mode, although other communication modes could be employed.

Base station controller (BSC) 330 includes equipment such as communication interfaces and processing systems for communicating with and controlling base station 320 over backhaul link 351. Base station controller 330 could also include communication equipment capable of routing communications exchanged between base station 320 and core network 340 to further systems and networks. In this example, base station 320 is operated by the same wireless service provider as base station controller 330.

Core network 340 is a core network of a wireless network in this example. Core network 340 could include further base stations, routers, gateways, controller systems, processing systems, access systems, Internet systems, or other communication equipment.

Figure 4:
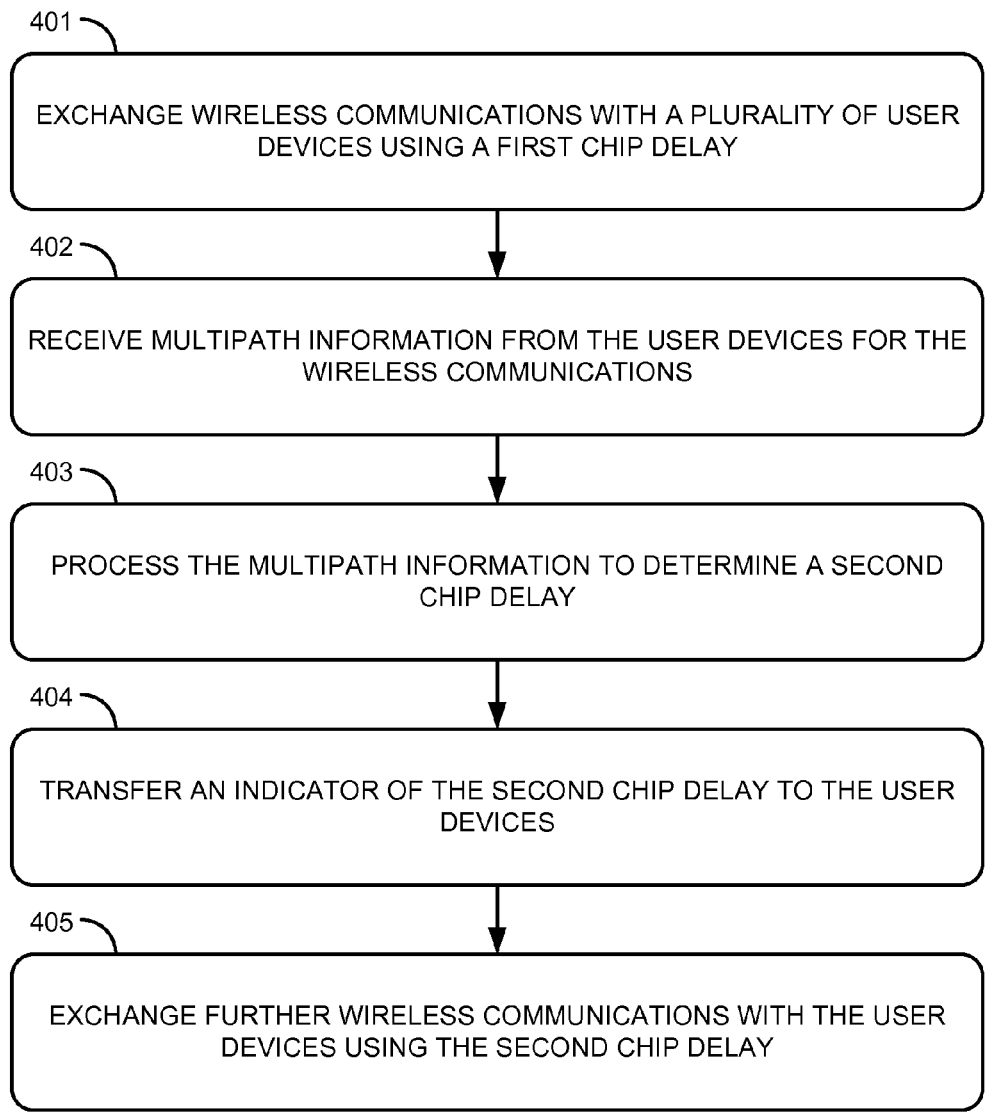
FIG. 4 is a flow diagram illustrating a method of operation of a communication system.

FIG. 4 is a flow diagram illustrating a method of operating communication system 300. The operations of FIG. 4 are referenced herein parenthetically. In FIG. 4, base station 320 exchanges (401) wireless communications with user devices 310-312 using a first chip delay. The wireless communications could include user communications, such as voice calls, text messages, data, Internet traffic, among other user communications. The wireless communications could also include overhead communications, such as system messages, parameter messages, resource assignment messages, test signals, pilot signals, or other overhead communications. The first chip delay includes a time-based chip delay for a transmit diversity configuration in this example. In time-based transmit diversity, communications are transmitted in multiple instances over a period of time. For example, communications transferred by base station 320 using the first chip delay could include transmitting a first portion of the communications at a first instance in time, and transmitting a copy of the first portion of the communications at a second instance in time, where the first instance in time and the second instance in time are separated by a time delay. In this example, the time delay comprises the chip delay. More than two transmit instances or chip delays could be employed. Likewise, communications transferred by user devices 310-112 could also employ the first chip delay similar to base station 320.

In this example, each of user devices 310-312 receive communications transferred by base station 320, as a part of wireless link 350, through different propagation pathways, and may experience multipath interference. The dotted lines in FIG. 3 are intended to represent multipath propagation of wireless link 350, and it should be understood that these dotted lines are merely representative. User device 310 receives communications transferred by base station 320 using wireless link 350 over a first direct path and a second reflected path reflected by obstacle 360. User device 311 receives communications transferred by base station 320 using wireless link 350 over only a first direct path, and does not experience any reflected transmissions. User device 312 receives communications transferred by base station 320 using wireless link 350 over a first direct path and a second reflected path reflected by obstacle 361. It should be understood that other configurations of reflections and multipath propagation could be experienced. Thus, each of user devices 310-312 experiences different multipath interference for communications transferred by base station 320. The communications could also be affected by other propagation interference encountered while in transit.

Each of user devices 310-312 determines multipath information for the communications received from base station 320. In some examples, the communications are specialized communications transferred by base station 320 which trigger a responsive transfer of the multipath information by each of user devices 310-312. In other examples, normal communications are monitored for multipath information by each of user devices 310-312 and a request for the multipath information is later transferred by base station 320. In yet further examples, each of user devices 310-312 periodically transfers multipath information to base station 320.

Base station 320 receives (402) multipath information from user devices 310-312 for the wireless communications. User devices 310-312 transfer the multipath information over wireless link 350 in this example. The multipath information could be included in user data, system messages, or could be responsive to messages transferred by base station 320 requesting multipath information. The multipath information includes information on the communications received at each of user devices 310-312 where the communications experience multipath interference or multipath propagation. The multipath information could include indicators of the time separations of multiple instances of received communications, noise ratio (SNR) information, RF signal quality indicators, RF noise indicators, RF power, raw sampled RF data, or scaled RF data for the received communications, among other representations of multipath information.

Base station 320 processes (403) the multipath information to determine a second chip delay. This second chip delay could be determined to optimize various parameters of RF signal quality or RF power requirements for further communications between base station 320 and user devices 310-312. For example, the second chip delay could be determined to enable a reduction in an RF power level of communications transferred by base station 320 while still maintaining a threshold level of RF signal quality experienced at user devices 310-312. User devices 310-312 could also be differentiated for different levels of service or RF quality, such as providing better wireless service to user device 310 at the expense of providing poorer wireless service to user device 311. Processing the multipath information could include processing the multipath information for only user devices with multipath information exceeding a multipath threshold to determine the second chip delay. Processing the multipath information could include processing the multipath information for only user devices reporting RF signal quality below a RF signal quality threshold to determine the second chip delay. In other examples, processing the multipath information comprises averaging the multipath information for user devices 310-312 to determine the second chip delay. Processing the multipath information could include omitting multipath information for individual user devices from the calculation of the second chip delay, such as user devices experiencing multipath interference below a threshold level could be omitted from a calculation of the second chip delay, and user devices experiencing multipath interference above the threshold level included in the calculation. In further examples, user devices experiencing multipath interference above a threshold level could be forced into a handoff with another base station rather than accommodating the multipath interference above the threshold level in the calculation of the second chip delay. Other configurations could be employed for the second chip delay.

Base station 320 transfers (404) an indicator of the second chip delay to user devices 310-312. User devices 310-312 receive the second chip delay over wireless link 350 in this example. The indicator of the second chip delay could be transferred over an overhead communications portion of wireless link 350, such as system messages, parameter messages, resource assignment messages, or other overhead communications. The indicator of the second chip delay could instead be transferred over user communication portions of wireless link 350. The indicator of the second chip delay could be a modifier for a default chip delay, such as a delta increase or decrease in a first chip delay. The second chip delay could be an indicator of a transmit delay between instances or copies of communications transmitted using a time-based diversity antenna system, such as an amount of delay time in seconds or a subdivision thereof. The second chip delay could be used for communications transferred by both base station 320 and by user devices 310-312. In further examples, the second chip delay is used for communications transferred by base station 320, and a third chip delay is used for communications transferred by each of user devices 310-312. In yet further examples, base station 320 determines separate chip delays for individual ones of user devices 310-312, and transfers the individual chip delays to each of user devices 310-312. The individual chip delays could be based on the multipath information transferred by the individual user devices, such as tailoring a chip delay to each of user devices 310-312 depending upon the multipath conditions experienced by each of user devices 310-312. Base station 320 could use the individualized chip delays for communications transferred to each of user devices 310-312, or user devices 310-312 could use the individualized chip delays for communications transferred to base station 320.

Base station 320 exchanges (405) further wireless communications with user devices 310-312 using the second chip delay. User devices 310-312 could use the indicator of the second chip delay to modify a transmit diversity of a transceiver portion therein for the further communications, or use in receiving or interpreting communications transferred by base station 320, among other configurations. Base station 320 could use the second chip delay for communications transferred therefrom, or for interpreting communications transferred by user devices 310-312, including combinations thereof. In other examples, user devices 310-312, or a subset thereof, could use the second chip delay for communications transferred therefrom, or for interpreting communications transferred by base station 320.

In yet further examples of determining the second chip delay, an iterative process could be employed. For example, the multipath information received using the first chip delay could be processed to determine the second chip delay. Second communications exchanged using the second chip delay could also have second multipath information determined by the user devices, and base station 320 could process the second multipath information to determine if the second chip delay improved the multipath interference or improved other signal quality indicators for the second communications. A third chip delay could then be determined based on the performance of the first chip delay and the second chip delay. Further iterations of determining chip delays could occur. In other examples, ongoing or periodic checking of the multipath information for the user devices could occur, and a present chip delay could be modified according to the performance indicated by the periodically checked multipath information. The further determination of chip delays could be triggered by an event, such as a periodic time cycle, a new user device requesting wireless access from base station 320, an existing user device leaving the service area of base station 320, or when RF conditions change beyond a threshold level, among other triggers.

Figure 5:
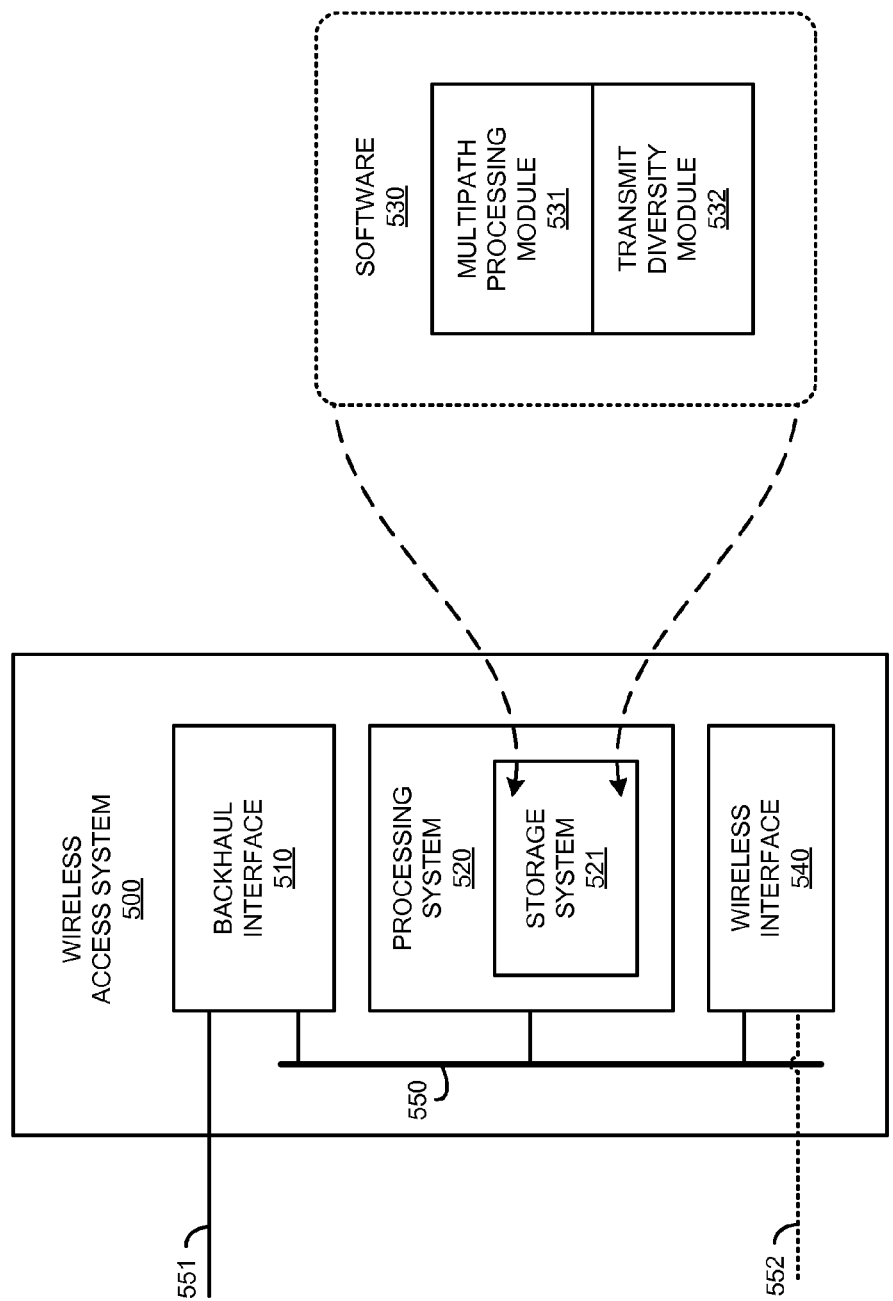
FIG. 5 is a block diagram illustrating a wireless access system.

FIG. 5 is a block diagram illustrating wireless access system 500, as an example of wireless access system 120 found in FIG. 1 or base station 320 found in FIG. 3, although wireless access system 120 or base station 320 could use other configurations. Wireless access system 500 includes backhaul interface 510, processing system 520, and wireless interface 540. Backhaul interface 510, processing system 520, and wireless interface 540 communicate over bus 550. Wireless access system 500 may be distributed among multiple devices that together form elements 510, 520-521, 530-532, 540, and 550-552.

Backhaul interface 510 comprises network router and gateway equipment for communicating with a network of a wireless communication provider, such as with a wireless network control system, core network, base station controller, or other communication systems. Backhaul interface 510 exchanges user communications and overhead communications over link 551. Link 551 could use various protocols or communication formats as described herein for links 141 or 351-352, including combinations, variations, or improvements thereof.

Processing system 520 includes storage system 521. Processing system 520 retrieves and executes software 530 from storage system 521. In some examples, processing system 520 is located within the same equipment in which backhaul interface 510 or wireless interface 540 are located. In further examples, processing system 520 comprises specialized circuitry, and software 530 or storage system 521 could be included in the specialized circuitry to operate processing system 520 as described herein. Storage system 521 could include a computer-readable medium such as a disk, tape, integrated circuit, server, or some other memory device, and also may be distributed among multiple memory devices.

Software 530 may include an operating system, logs, utilities, drivers, networking software, and other software typically loaded onto a computer system. Software 530 could contain application programs, server software, firmware, or some other form of computer-readable processing instructions. When executed by processing system 520, software 530 directs processing system 520 to operate as described herein, such as receive multipath information, process multipath information to determine diversity configurations, and instruct wireless interface 540 to exchange wireless communications with wireless communication devices, among other operations.

In this example, software 530 includes multipath processing module 531 and transmit diversity module 532. It should be understood that a different configuration could be employed, and individual modules of software 530 could be included in different equipment than wireless access system 500. Multipath processing module 531 receives multipath information transferred by user devices and processes the multipath information. Multipath processing module 531 interprets the multipath information to transfer instructions to transmit diversity module 532. Transmit diversity module 532 processes the interpreted multipath information received from multipath processing module 531 and determines transmit diversity configurations. The transmit diversity configurations could be determined for wireless access system 500 or for user devices. The transmit diversity configurations are transferred for delivery to wireless interface 540 for use in configuring transceiver elements, and in many examples, configurations are transferred for delivery to user devices.

Wireless interface 540 comprises communication interfaces for communicating with wireless communication devices, such as user devices. Wireless interface 540 could include transceiver equipment, signal delay elements, and antenna elements for wirelessly exchanging user communications and overhead communications with user devices in a wireless communication system, omitted for clarity, over the associated wireless link 552. Wireless interface 540 also receives command and control information and instructions from processing system 520 or backhaul interface 510 for controlling the operations of user devices over wireless link 552, coordinating handoffs of user devices between each other or other wireless access nodes, and transferring communications for delivery to user devices. Wireless link 552 could use various protocols or communication formats as described herein for wireless links 140 or 350, including combinations, variations, or improvements thereof.

Bus 550 comprises a physical, logical, or virtual communication link, capable of communicating data, control signals, and communications, along with other information. In some examples, bus 550 is encapsulated within the elements of backhaul interface 510, processing system 520, or wireless interface 540, and may be a software or logical link. In other examples, bus 550 uses various communication media, such as air, space, metal, optical fiber, or some other signal propagation path, including combinations thereof. Bus 550 could be a direct link or might include various equipment, intermediate components, systems, and networks.

Figure 6:
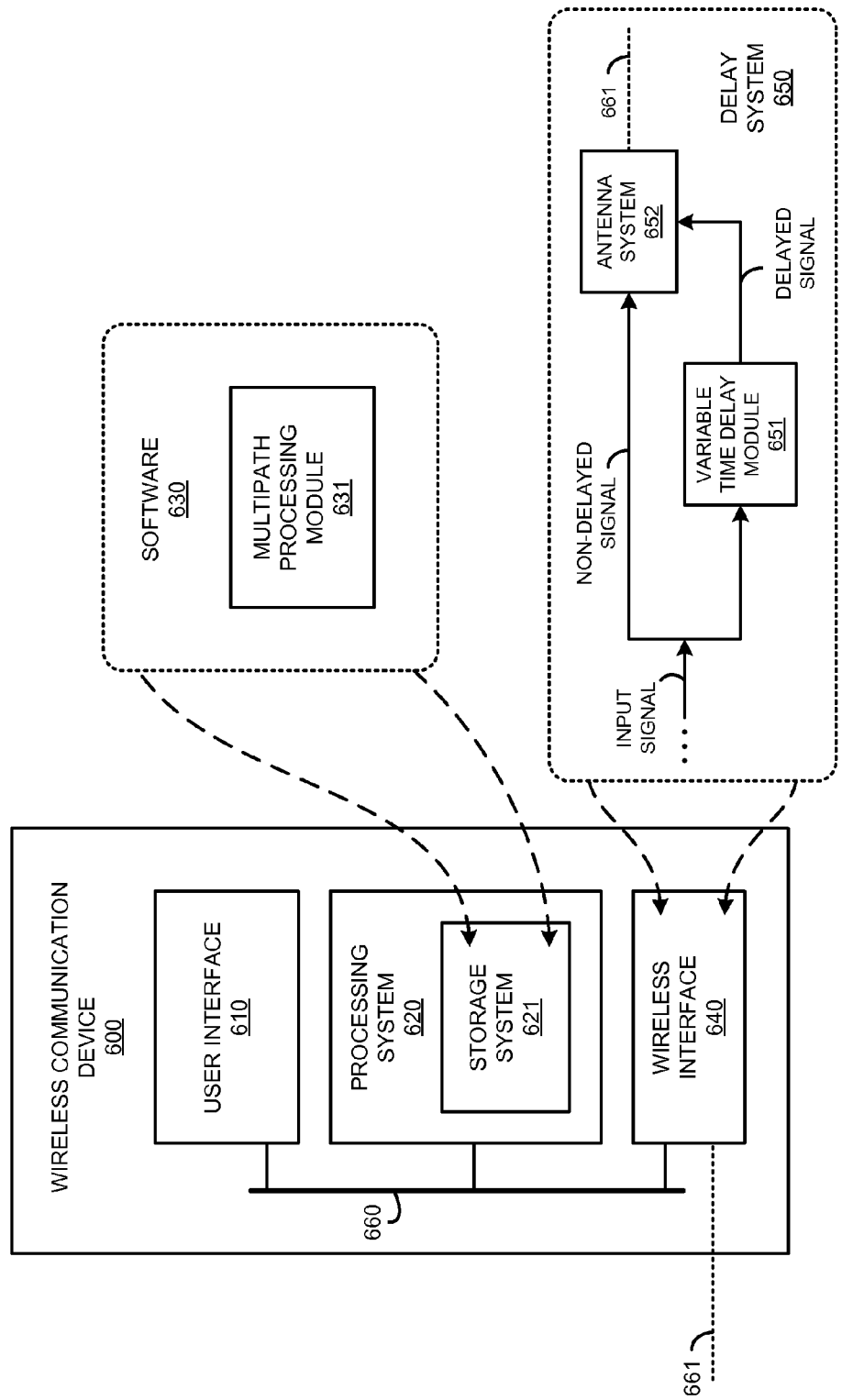
FIG. 6 is a block diagram illustrating a wireless communication device.

FIG. 6 is a block diagram illustrating wireless communication device 600, as an example of user devices 110-111 found in FIG. 1 or user devices 310-312 found in FIG. 3, although user devices 110-111 and 310-312 could use other configurations. Wireless communication device 600 includes user interface 610, processing system 620, and wireless interface 640. User interface 610, processing system 620, and wireless interface 640 communicate over bus 660. Wireless communication device 600 may be distributed or consolidated among equipment or circuitry that together form elements 610, 620-621, 630-631, 640, 650-652, and 660-661.

User interface 610 includes equipment and circuitry for receiving user input and control, such as for engaging in voice calls, data sessions, or controlling wireless communication device 600, among other operations. Examples of the equipment and circuitry for receiving user input and control include push buttons, touch screens, selection knobs, dials, switches, actuators, keys, keyboards, pointer devices, microphones, transducers, potentiometers, non-contact sensing circuitry, or other human-interface equipment. User interface 610 also includes equipment to communicate information to a user of wireless communication device 600. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof.

Processing system 620 includes storage system 621. Processing system 620 retrieves and executes software 630 from storage system 621. In some examples, processing system 620 is located within the same equipment in which user interface 610 or wireless interface 640 are located. In further examples, processing system 620 comprises specialized circuitry, and software 630 or storage system 621 could be included in the specialized circuitry to operate processing system 620 as described herein. Storage system 621 could include a computer-readable medium such as a disk, tape, integrated circuit, server, or some other memory device, and also may be distributed among multiple memory devices.

Software 630 may include an operating system, logs, utilities, drivers, networking software, and other software typically loaded onto a computer system. Software 630 could contain application programs, server software, firmware, or some other form of computer-readable processing instructions. When executed by processing system 620, software 630 directs processing system 620 to operate as described herein, such as receive multipath information, process multipath information to determine diversity configurations, and instruct wireless interface 640 to exchange wireless communications with wireless communication devices, among other operations.

In this example, software 630 includes multipath processing module 631. It should be understood that a different configuration could be employed, and individual modules of software 630 could be included in different equipment in wireless communication device 600. Multipath processing module 631 determines multipath information based on communications received over wireless link 552. Multipath processing module 631 interprets the received communications to determine multipath information to transfer to wireless access nodes.

Wireless interface 640 comprises a communication interface for communicating with wireless access nodes. Wireless interface 640 could include transceiver equipment, signal delay elements, and antenna elements for wirelessly exchanging user communications and overhead communications with user devices in a wireless communication system, omitted for clarity, over the associated wireless link 661. Wireless interface 640 also receives command and control information and instructions from processing system 620 or user interface 610 for controlling the operations of wireless communications over wireless link 662. Wireless link 662 could use various protocols or communication formats as described herein for wireless links 140 or 350, including combinations, variations, or improvements thereof.

Wireless interface 640 includes delay system 650. Delay system 650 comprises variable time delay module 651 and antenna system 652. In this example, delay system 650 receives a communication signal for transmission over wireless link 661, creates a delayed version of the communication signal, and passes on a non-delayed version of the communication signal, as shown in FIG. 6. Variable time delay module 651 includes transmission delay elements, such as delay lines, transmission gates, buffers, or other delay elements whose amount of delay can be varied. The amount of delay variation of variable time delay module 651 is selectively configured by a transmit diversity configuration received by wireless communication device 600, such as a chip delay.

Antenna system 652 includes antenna elements and could include mixer circuitry, further delay elements, signal combination circuitry, or other circuitry and elements for transferring a wireless signal over wireless link 661. The wireless signal transferred over wireless link 661 in this example comprises the non-delayed signal and the delayed signal. Wireless access system 500 of FIG. 5 could also include elements similar to delay system 650 of FIG. 6.

Bus 660 comprises a physical, logical, or virtual communication link, capable of communicating data, control signals, and communications, along with other information. In some examples, bus 660 is encapsulated within the elements of user interface 610, processing system 620, or wireless interface 640, and may be a software or logical link. In other examples, bus 660 uses various communication media, such as air, space, metal, optical fiber, or some other signal propagation path, including combinations thereof. Bus 660 could be a direct link or might include various equipment, intermediate components, systems, and networks.

Referring back to FIG. 1, user devices 110-111 each comprise radio frequency (RF) communication circuitry and antenna elements. The RF communication circuitry typically includes amplifiers, filters, modulators, transmit delay elements, and signal processing circuitry. User devices 110-111 may each also include user interface systems, memory devices, computer-readable storage mediums, software, processing circuitry, or some other communication components. User devices 110-111 each may be a wireless communication device, subscriber equipment, customer equipment, access terminal, telephone, mobile wireless telephone, computer, e-book, mobile Internet appliance, wireless network interface card, media player, game console, or some other wireless communication apparatus, including combinations thereof. Although two user devices are shown in FIG. 1, it should be understood that a different number of user devices could be shown.

Wireless access system 120 comprises RF communication and control circuitry, antenna elements, and communication routing equipment and systems. The RF communication circuitry typically includes amplifiers, filters, RF modulators, transceivers, transmit delay elements, and signal processing circuitry. In many examples, wireless access system 120 includes equipment to provide wireless access to communication services for user devices, such as user devices 110-111 shown in FIG. 1, as well as route communications between core network 130 and user devices 110-111, process multipath information, and determine transmit diversity information. Wireless access system 120 may also comprise data modems, routers, servers, memory devices, software, processing circuitry, cabling, network communication interfaces, physical structural supports, or other communication apparatuses. Wireless access system 120 may also comprise wireless access nodes, base stations, base transceiver stations, base station controllers (BSC), mobile switching centers (MSC), radio node controllers (RNC), or other communication equipment and apparatuses.

Core network 130 could include further wireless access nodes, or could include base station controllers (BSC), mobile switching centers (MSC), radio node controllers (RNC), call processing systems, authentication, authorization and accounting (AAA) equipment, access service network gateways (ASN-GW), Internet access nodes, telephony service nodes, wireless data access points, or other wireless communication systems, including combinations thereof. Core network 130 may also comprise optical networks, asynchronous transfer mode (ATM) networks, packet networks, metropolitan-area networks (MAN), or other network topologies, equipment, or systems, including combinations thereof. In typical examples, core network 130 includes many wireless access nodes and associated equipment for providing communication services to many user devices across a geographic region.

Wireless link 140 uses the air or space as the transport media. Wireless link 140 may use various protocols, such as Code Division Multiple Access (CDMA), Evolution-Data Optimized (EV-DO), single-carrier radio transmission technology link (1xRTT), Worldwide Interoperability for Microwave Access (WIMAX), Global System for Mobile Communication (GSM), Universal Mobile Telecommunications System (UMTS), Long Term Evolution (LTE), Wireless Fidelity (WIFI), High Speed Packet Access (HSPA), Radio Link Protocol (RLP), or some other wireless communication format, including combinations, improvements, or variations thereof. Although one main wireless link 140 is shown in FIG. 1, it should be understood that wireless link 140 is merely illustrative to show a communication mode or wireless access pathway for user devices 110-111. In other examples, further wireless links could be shown, with portions of the further wireless links shared between user devices 110-111 and used for different communication sessions and associated paging or overhead communications.

Communication link 141 uses metal, glass, optical, air, space, or some other material as the transport media. Communication link 141 could use various communication protocols, such as Time Division Multiplex (TDM), asynchronous transfer mode (ATM), Internet Protocol (IP), Ethernet, synchronous optical networking (SONET), circuit-switched, communication signaling, or some other communication format, including combinations, improvements, or variations thereof. Communication link 141 could be a direct links or may include intermediate networks, systems, or devices.

Links 140-141 may each include many different signals sharing the same associated link—as represented by the associated lines in FIG. 1—comprising access channels, paging channels, notification channels, forward links, reverse links, user communications, communication sessions, overhead communications, frequencies, other channels, carriers, timeslots, spreading codes, transportation ports, logical transportation links, network sockets, packets, or communication directions. In many examples, the portion of wireless link 140 as transmitted by the associated ones of user devices 110-111 is referred to an uplink or reverse link of the wireless link, while the portion as transmitted by wireless access system 120 is referred to as a downlink or forward link of the wireless link.

FIGS. 1-6 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless access system, the method comprising:
exchanging wireless communications with a plurality of user devices that presently use a first transmit diversity time delay, the wireless communications being transmitted at a first instance in time and a second instance in time separated according to the first transmit diversity time delay;
receiving multipath information from the user devices based on the wireless communications received by the user devices from the wireless access system, wherein the multipath information comprises radio frequency (RF) power information determined by each of the user devices for the wireless communications received under multipath wireless conditions;
processing the multipath information received from the user devices to determine a second transmit diversity time delay for use in the user devices to reduce RF transmit power by the wireless access system while still maintaining a threshold level of RF signal quality experienced by the ones of the user devices;
transferring an indicator of the second transmit diversity time delay to the user devices; and
exchanging further wireless communications with the user devices using the second transmit diversity time delay in the user devices, the further wireless communications being transmitted at a third instance in time and a fourth instance in time separated according to the second transmit diversity time delay.

2. The method of claim 1, wherein the multipath information comprises signal to noise ratio (SNR) information determined by each of the user devices for the wireless communications received under multipath wireless conditions.

3. The method of claim 1, wherein processing the multipath information to determine the second transmit diversity time delay comprises averaging the multipath information for the user devices to determine the second transmit diversity time delay.

4. The method of claim 1, wherein processing the multipath information to determine the second transmit diversity time delay comprises processing the multipath information for only user devices with multipath information exceeding a multipath threshold to determine the second transmit diversity time delay.

5. The method of claim 1, wherein processing the multipath information to determine the second transmit diversity time delay comprises processing the multipath information for only user devices reporting RF signal quality below a RF signal quality threshold to determine the second transmit diversity time delay.

6. The method of claim 1, further comprising:
receiving second multipath time delay from the user devices for the further communications;
processing first transmit diversity time delay, the second transmit diversity time delay, the multipath information and the second multipath information to determine a third transmit diversity time delay;
transferring an indicator of the third transmit diversity time delay to the user devices; and
exchanging third wireless communications with the user devices using the third transmit diversity time delay.

7. The method of claim 1, wherein the first transmit diversity time delay comprises a time based transmit diversity chip value.

8. The method of claim 1, wherein the second transmit diversity time delay comprises a time based transmit diversity chip value different from the first transmit diversity time delay.

9. The method of claim 1, wherein the first transmit diversity time delay comprises a time delay for a delayed signal transmission in a transmit diversity antenna system of each of the user devices, wherein a non-delayed signal transmission and the delayed signal transmission comprise the wireless communications.

10. A wireless access system, comprising:
- a transceiver configured to exchange wireless communications with a plurality of user devices that presently use a first transmit diversity time delay, the wireless communications transmitted at a first instance in time and a second instance in time separated according to the first transmit diversity time delay;
- the transceiver configured to receive multipath information from the user devices based on the wireless communications received by the user devices from the wireless access system, wherein the multipath information comprises radio frequency (RF) power information determined by each of the user devices for the wireless communications received under multipath wireless conditions;
- a processing system configured to process the multipath information received from the user devices to determine a second transmit diversity time delay for use in the user devices to reduce RF transmit power by the wireless access system while still maintaining a threshold level of RF signal quality experienced by the ones of the user devices; and
- the transceiver configured to transfer an indicator of the second transmit diversity time delay to the user devices, and exchange further wireless communications with the user devices using the second transmit diversity time delay in the user devices, the further wireless communications transmitted at a third instance in time and a fourth instance in time separated according to the second transmit diversity time delay.

11. The wireless access system of claim 10, wherein the multipath information comprises signal to noise ratio (SNR) information determined by each of the user devices for the wireless communications received under multipath wireless conditions.

12. The wireless access system of claim 10, wherein the processing system is configured to average the multipath information for the user devices to determine the second transmit diversity time delay.

13. The wireless access system of claim 10, wherein the processing system is configured to process the multipath information for only user devices with multipath information exceeding a multipath threshold to determine the second transmit diversity time delay.

14. The wireless access system of claim 10, wherein the processing system is configured to process the multipath information for only user devices reporting RF signal quality below an RF signal quality threshold to determine the second transmit diversity time delay.

15. The wireless access system of claim 10, comprising:
- the transceiver configured to receive second multipath information from the user devices for the further communications;
- the processing system configured to process the first transmit diversity time delay, the second transmit diversity time delay, the multipath information and the second multipath information to determine a third transmit diversity time delay; and
- the transceiver configured to transfer an indicator of the third transmit diversity time delay to the user devices, and exchange third wireless communications with the user devices using the third transmit diversity time delay.

16. The wireless access system of claim 10, wherein the first transmit diversity time delay comprises a time based transmit diversity chip value.

17. The wireless access system of claim 10, wherein the second transmit diversity time delay comprises a time based transmit diversity chip value different from the first transmit diversity time delay.

18. The wireless access system of claim 10, wherein the first transmit diversity time delay comprises a time delay for a delayed signal transmission in a transmit diversity antenna system of each of the user devices, wherein a non-delayed signal transmission and the delayed signal transmission comprise the wireless communications.

* * * * *